United States Patent [19]

Lohmann et al.

[11] 4,014,396

[45] Mar. 29, 1977

[54] WEIGHING APPARATUS

[75] Inventors: Ernst Lohmann, Duisburg;
Hans-Joachim Sacht,
Duisburg-Rahm, both of Germany

[73] Assignee: Berkel GmbH, Duisburg, Germany

[22] Filed: July 31, 1975

[21] Appl. No.: 600,899

[30] Foreign Application Priority Data

Aug. 1, 1974 Germany .......................... 2437058

[52] U.S. Cl. ................................. 177/169; 177/230
[51] Int. Cl.² ................. G01G 23/14; G01G 23/26
[58] Field of Search .......................... 177/168–170, 177/174, 225, 230

[56] References Cited
UNITED STATES PATENTS

| | | | |
|---|---|---|---|
| 1,806,741 | 5/1931 | Cameron | 177/225 UX |
| 2,029,926 | 2/1936 | Hurt | 177/168 X |
| 2,244,621 | 6/1941 | Hurt | 177/174 |
| 3,580,095 | 5/1971 | Seed | 177/174 UX |
| 3,647,010 | 3/1972 | Beardmore et al. | 177/170 X |
| 3,698,496 | 10/1972 | Lohmann | 177/168 X |
| 3,709,310 | 1/1973 | Cooke et al. | 177/168 |

FOREIGN PATENTS OR APPLICATIONS

| | | | |
|---|---|---|---|
| 228,527 | 12/1962 | Austria | 177/230 |
| 380,401 | 9/1964 | Switzerland | 177/170 |

*Primary Examiner*—George H. Miller, Jr.
*Attorney, Agent, or Firm*—Lockwood, Dewey, Zickert & Alex

[57] ABSTRACT

Apparatus for weighing goods or articles which includes a movement and indication assembly having a movement means and an indication means driven by the movement means wherein the movement means exhibits hysteresis between weighing operations involving increasing and decreasing weights of goods, a weighing platform on which the goods or articles are received for the weighing operations, a bar linkage mechanism between the weighing platform and the movement means, and a counterforce means connected to the bar linkage mechanism. An extension member is provided in the bar linkage mechanism to eliminate the hysteresis effect in the movement means to reflect greater accuracy in the indication means.

23 Claims, 14 Drawing Figures

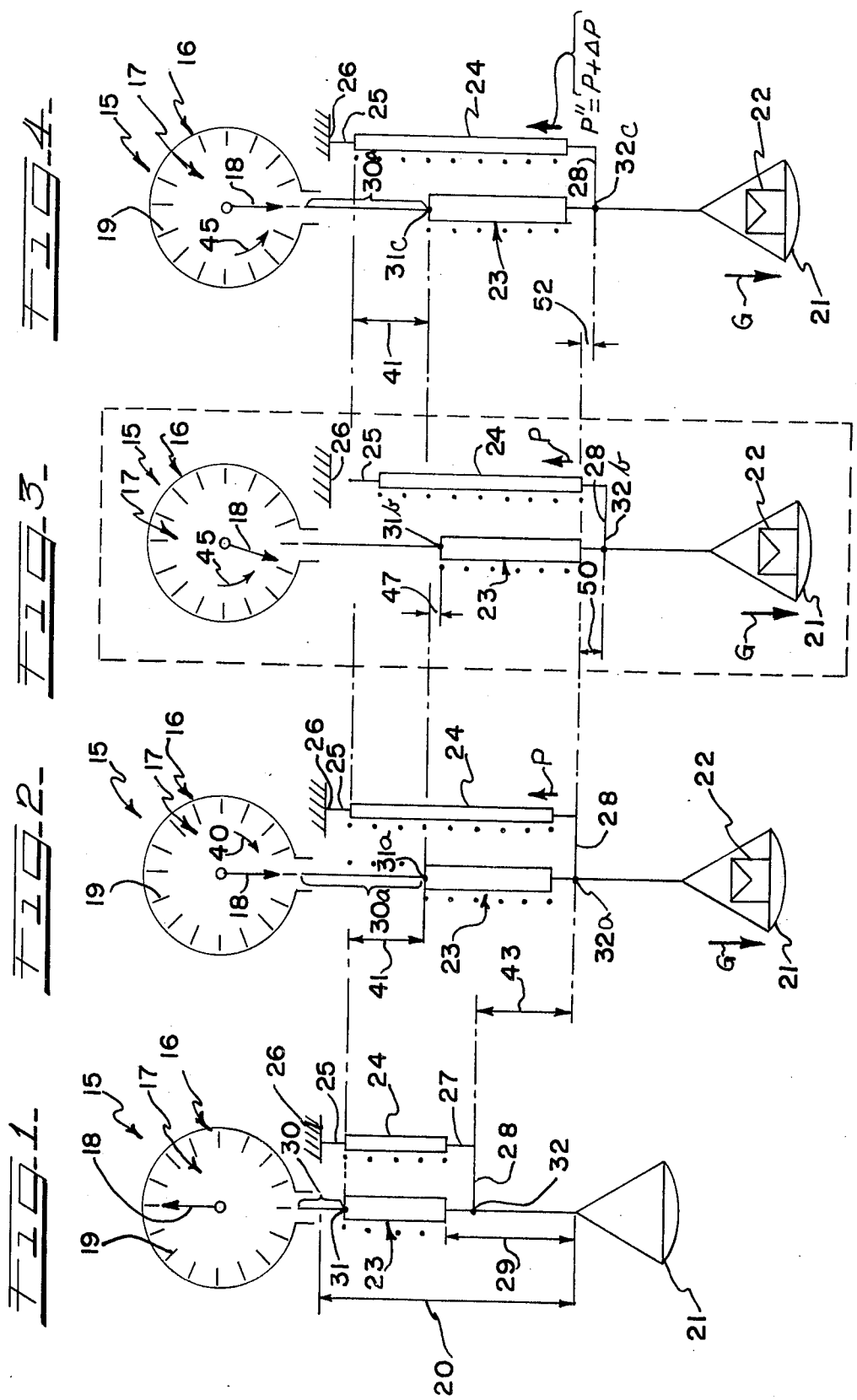

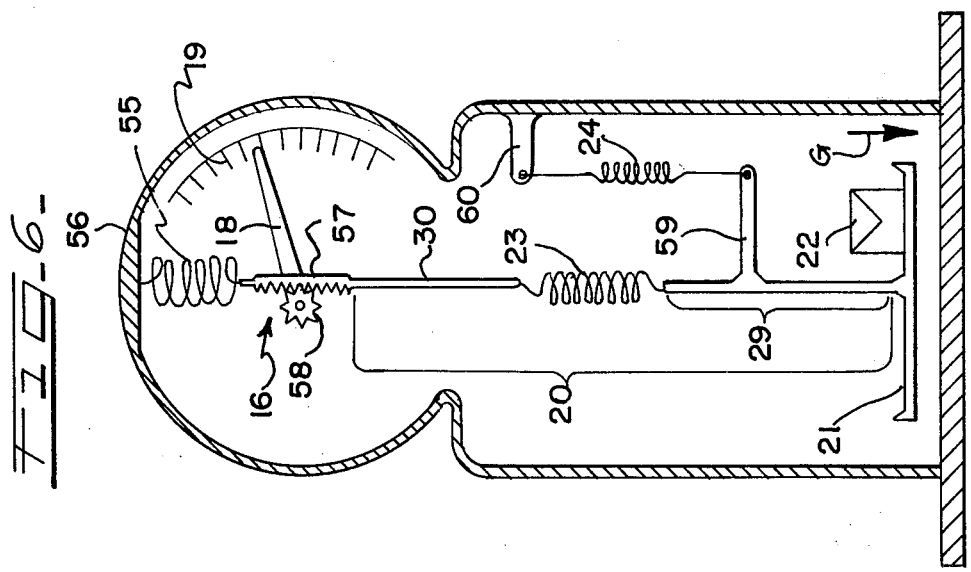
FIG-6-
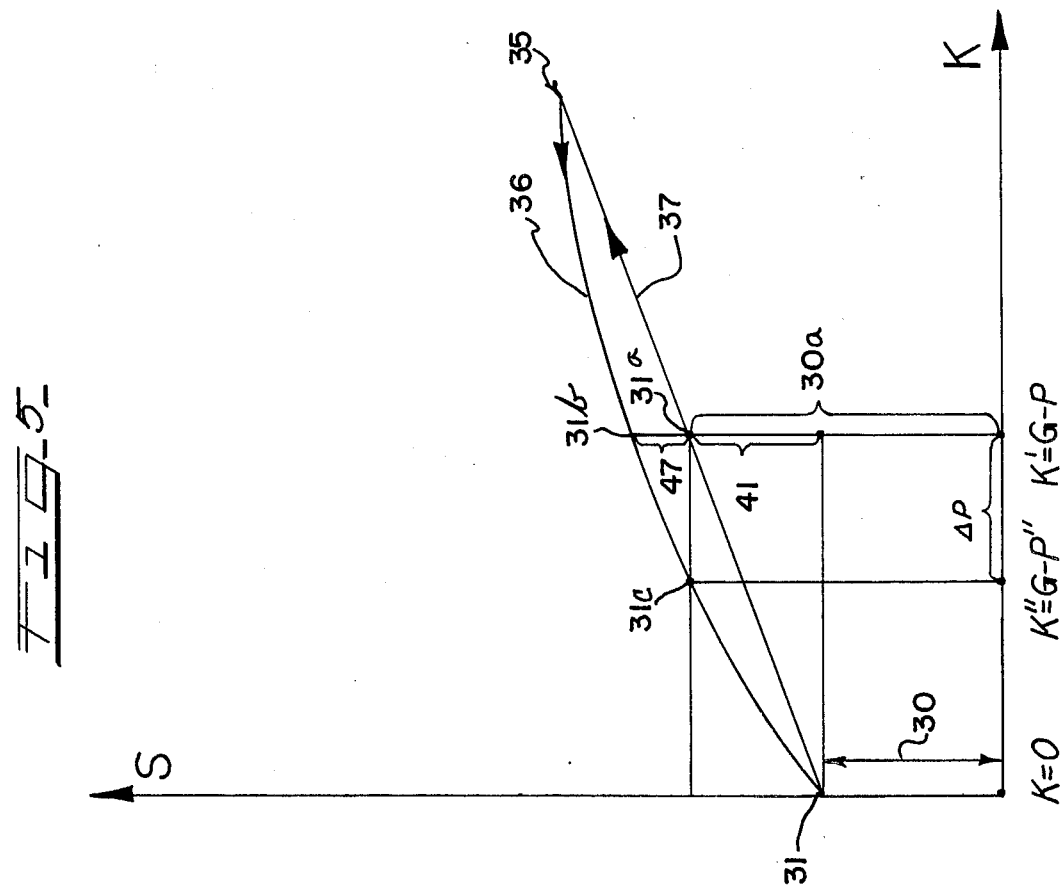
FIG-5-

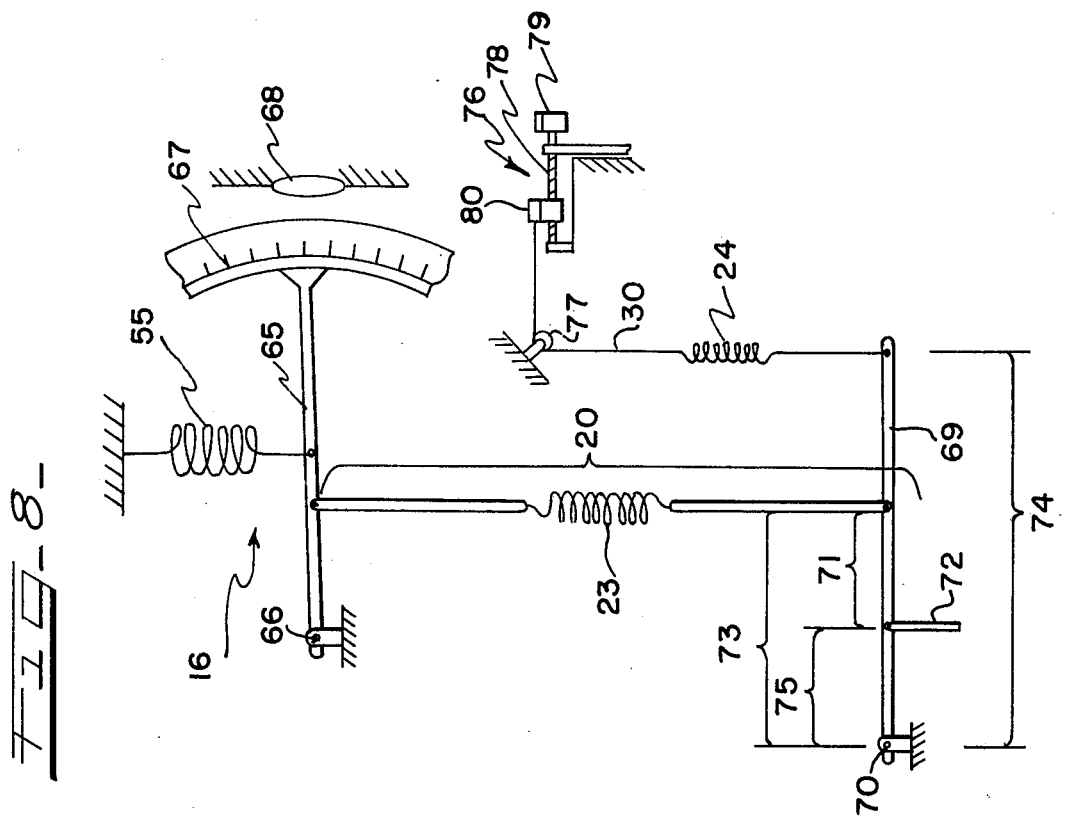
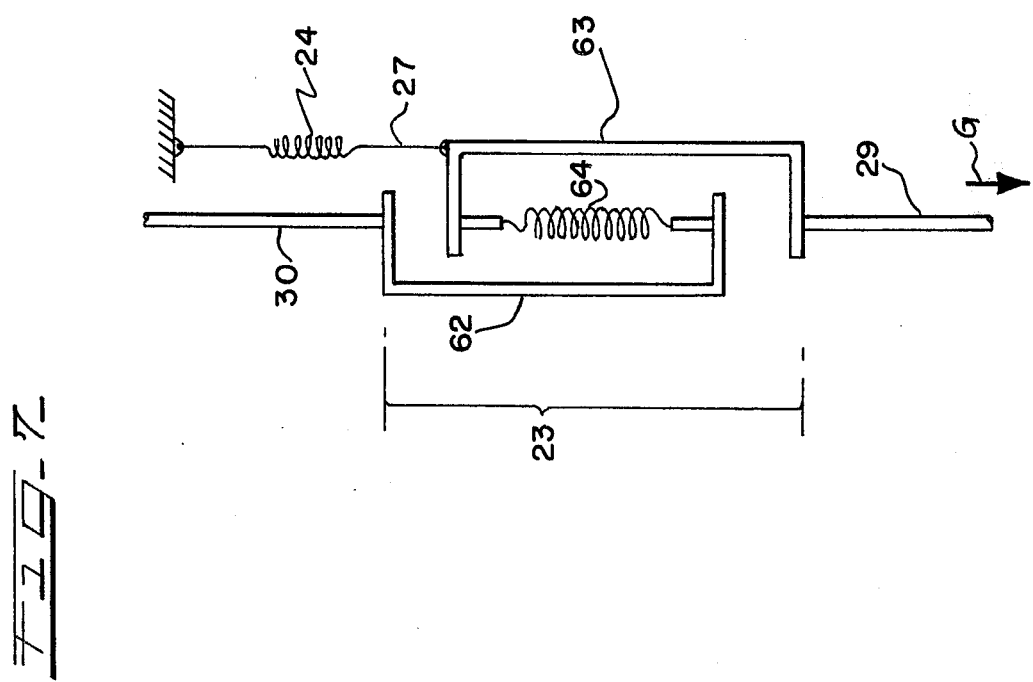

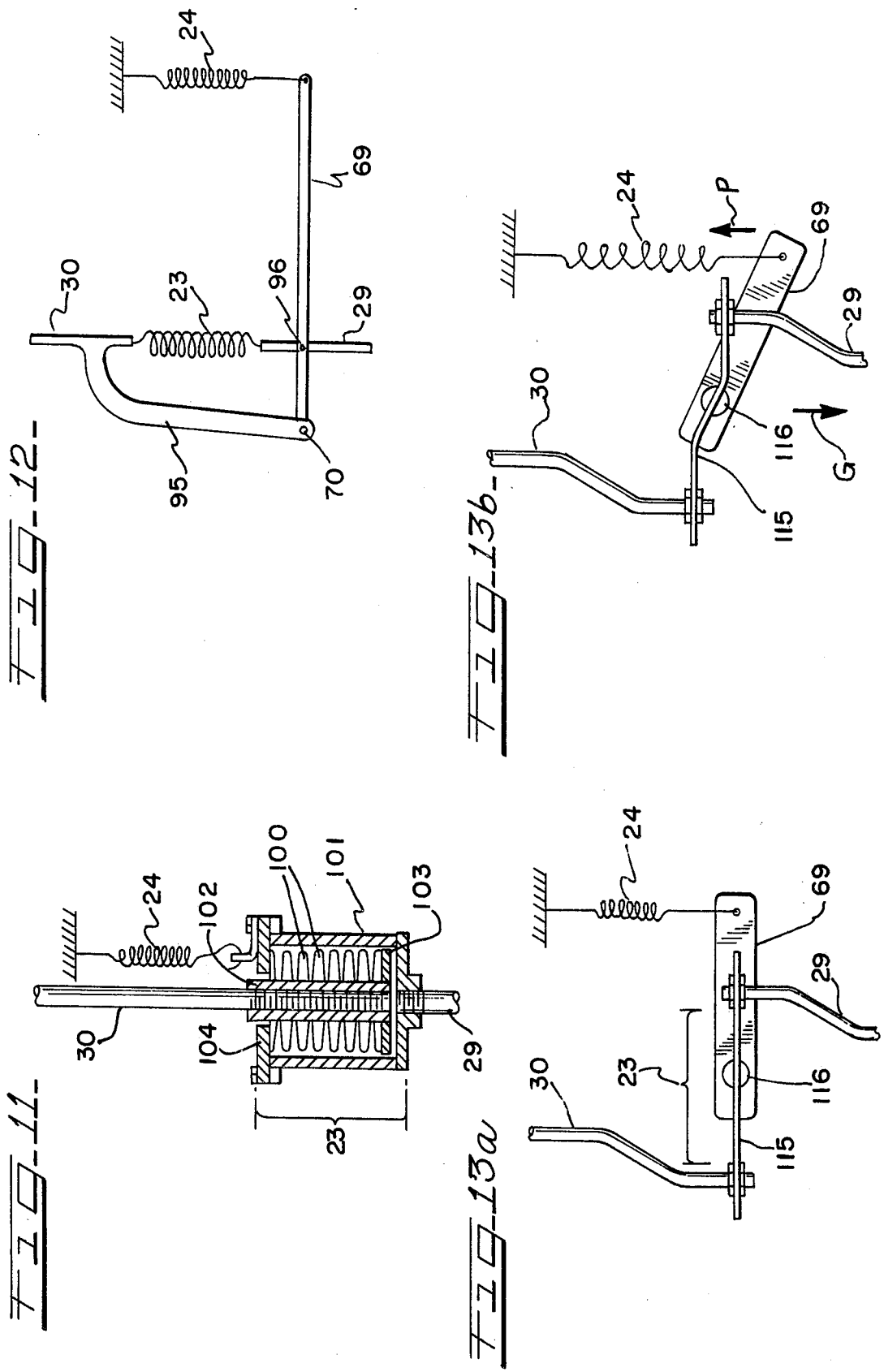

WEIGHING APPARATUS

This invention relates in general to weighing scales, and more particularly to weighing apparatus having a movement assembly that exhibits hysteresis between weighing operations involving increasing and decreasing loads, and still more particularly to weighing apparatus which eliminates the hysteresis effect in the movement assembly of the apparatus.

Hysteresis in the weight indication of weighing apparatus is caused during successive weighing operations involving increasing or decreasing loads. More specifically, each hysteresis results from the construction of the movement means in a weighing scale in connection with the properties of the materials utilized for the movement and the bearing tolerances of the components in the movement. Depending upon a given loading of the movement during a weighing operation, a higher than actual weight indication is obtained during the weighing operation of a subsequent load if the weight of the previous load was higher, while a lower than actual weight indication is obtained if the movement was previously exposed to a lower load than the given load. Thus, for a given load, hysteresis is reflected in the indication means through the movement means where subsequent loads are of a higher or lower value. It has even been found that such a hysteresis effect is present in costly precision movements. Accordingly, the accuracy of such a weighing apparatus is limited, which thereby limits the precision in the graduated scale of the indication means.

Heretofore, attempts have been made to overcome inaccuracies due to hysteresis by providing a pair of opposing springs in the movement means for the purpose of having the mutually opposed individual hysteresis effects of the springs compensate for one another relative their effect on the indication means. However, difficulties are encountered here in obtaining a satisfactory compensation in that the hysteresis curves of the springs for all practical purposes cannot be the same. It is just not possible to adjust the hysteresis effects of the springs to obtain perfect compensation.

It is therefore an object of the present invention to overcome the previous difficulties encountered in connection with the hysteresis effect of a movement means in a weighing apparatus to provide a higher accuracy in weight measurement by the elimination of the hysteresis effect.

Another object of this invention is in the provision of a weighing apparatus having means for eliminating the hysteresis effect in the movement wherein the precision of a graduated scale in the indication means can be greatly increased to obtain substantially higher accuracy in weight measurement.

A typical weighing apparatus according to the present invention would include a movement and indication assembly having a movement and an indicator, a weighing platform upon which the load to be weighed is supported during a weighing operation, a bar linkage mechanism connected between the movement and the weighing platform and counterforce or counterbalance means connected to the bar linkage mechanism. An extension means is provided in the bar linkage mechanism between the connection to the movement and the connection to the counterforce means to eliminate the hysteresis effect in the movement. The extension means increases the path difference of the hysteresis effect and the direction of elongation of the extension member is opposed to the action of the counterforce means.

The load of the goods or article being weighed by the scale is applied through the weighing platform to the bar linkage mechanism. The extension member in the bar linkage mechanism being resilient or flexible changes in length depending upon the value of the load. This change in length of the extension member, while having no direct effect on the indication means or indicator, produces a force in the counterforce member which is opposed to the weight of the load. This force reacts upon the forces in the movement and shifts the weight indication according to the magnitude of the hysteresis effect. The initial hysteresis effect of the movement is increased by the extension member to a higher value in the region of the point where the counterforce member is connected to the bar linkage mechanism. Accordingly, the extension member functions as an "extension amplifier" for the path difference caused in the bar linkage mechanism by the hysteresis effect.

More particularly, the portion of the bar linkage mechanism at the end of the extension member connecting to the movement forms the "inlet" of the extension amplifier and produces, depending upon the load, the relatively small changes in the path of the movement with the hysteresis effect which produces the "input pulses" of the amplifier. However, the portion of the bar linkage mechanism at the other end of the extension member exhibits relatively large changes in movement with a greater hysteresis effect since the changes in length of the extension member are added to the path lengths produced from the movement. This portion of the bar linkage mechanism may be defined as the "outlet" of the extension amplifier. Therefore, the hysteresis effect at the outlet of the extension amplifier is initially increased. The outlet of the extension amplifier is also acted upon by the counterforce member which produces a force opposed to the direction of elongation of the bar linkage mechanism and likewise to the weight of the load acting on the bar linkage mechanism. It may then be seen that a path length variation influenced by the hysteresis effect of the movement at the outlet side of the extension amplifier produces at this portion of the bar linkage mechanism a correspondingly higher counterforce component in the counterforce member. Accordingly, the load on the bar linkage mechanism being transmitted to the movement as produced by the weight of the load is reduced by the magnitude of this counterforce component. The extent of this change of force in the movement depends on the amplification ratio of the hysteresis effect which triggers it, thereby making an easy adjustment possible. Further, for a given amplification ratio, the greater the hysteresis effect will result in the greater the counterforce which reduces the weight of the load registered by the movement. Therefore, the movement indicates as needed a lower value of weight than that which otherwise would be produced by the hysteresis effect.

A simple suitable adjustment of the "amplification ratio" of the hysteresis effect in the extension member produces the counterforce in the bar linkage mechanism necessary to thereby produce in the movement such a reduction in the weight of the load that for weighing operations with decreasing weight, the indicating unit shows the same value of weight as for weighing operations with increasing weight. While the hysteresis effect is still present, such is not transmitted to the indicating unit. It will be appreciated the hysteresis effect, although amplified, produces a correct value for a counterforce which reduces the weight of a load in an accurate proportion. Accordingly, the invention insures the accuracy of weight indication independent of the value of the load in a preceding weighing operation.

Because of the accuracy of weight indication between weighing operations, a more precision graduated indication on the indicator is possible. Further, it can be recognized that the only additional components required to carry out the present invention is an elastic or resilient body defining the extension member which may be easy and economical to manufacture and easy to install with the other components. It is even possible that such an extension member may be installed in already existing weighing scale apparatus. In one of its simplest forms, the extension member may be inserted as an intermediate member in the bar linkage mechanism to transmit the weight of the load to the movement. Specifically, the extension member may be in the form of a resilient device, such as a soft spring, that may produce at the outlet side the desired long path variation. In the sense of a large amplification in the elongation, the counterforce member which is connected to the bar linkage mechanism may be adjustable. In this respect, the counterforce member may be connected to the extension member by means of a translating lever to thereby permit ease of adjustment.

Other objects, features and advantages of the invention will be apparent from the following detailed disclosure, taken in conjunction with the accompanying sheets of drawings, wherein like reference numerals refer to like parts, in which:

FIGS. 1 to 4 show diagrammatic views of a weighing scale according to the invention in different operational positions, wherein FIG. 3 illustrates a hypothetical situation for assisting in the explanation of the invention;

FIG. 5 is a graphical illustration of the hysteresis curve for the apparatus of the invention where the path length at the inlet of the extension member is plotted against the force acting on the movement;

FIG. 6 is a cross-sectional view taken through one embodiment of a weighing scale according to the invention in its simplest form;

FIG. 7 is a detailed elevational view of a modification of the extension member that may be utilized in the weighing scale of FIG. 6;

FIG. 8 is a somewhat diagrammatic view of another embodiment of the invention illustrating an adjustable counterforce member;

FIG. 11 is a detailed elevational view with some parts in section of a further modified extension member which is capable of producing a high hysteresis effect;

FIG. 12 is a detailed elevational view of a still further modified extension member; and FIGS. 13a and 13b are detailed elevational views of a still further modified extension member shown first in unloaded condition in FIG. 13a and then in loaded condition in FIG. 13b.

Figure 9:
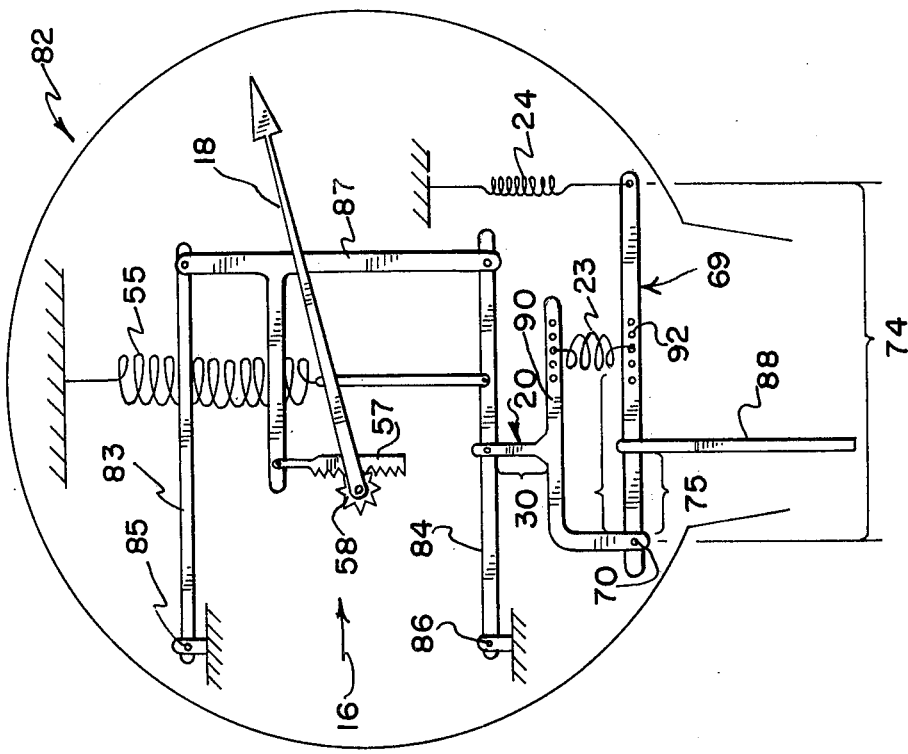
FIG. 9 is a somewhat diagrammatic view of another embodiment of the invention having an adjustable extension member.

Referring now to the drawings and particularly to the diagrammatic illustrations of a weighing scale according to the invention, as shown in FIGS. 1 to 4, a weighing apparatus, generally indicated by the numeral 15, includes a movement 16 that may be of a conventional spring or pendulum type. The loading of the movement 16 is transmitted to an indicator or indication unit 17, which includes an indicating needle or pointer 18 movable relative to a graduated scale 19.

The graduated scale 19 is fixed, while the indicating pointer rotates relative to the scale. Weighing forces are transmitted to the movement 16 through a bar linkage mechanism 20 that carries at its lower end a weighing platform 21 onto which a load 22, as seen in FIGS. 2, 3 and 4, can be supported. An extension member or extension amplifier 23 is mounted in the bar linkage mechanism 20 and which changes in length in response to the weight value of a load on the weighing platform. A counterforce member 24 extends parallel to the bar linkage mechanism 20 and has its upper end 25 fixed to a stationary part 26 of the weighing scale, while its lower end portion 27 is connected to a link 28 that is in turn connected to the lower part 29 of the bar linkage mechanism or at a point between the extension member and the weighing platform.

In order to understand the operation of the weighing scale with the present invention, the position of point 31 at the inlet side of the extension member 23 and at the upper part 30 of the bar linkage mechanism will be compared with point 32 at the outlet end 29 of the extension member. It will be appreciated the counterforce member 24 will also be flexible or resilient, such as in the form of a spring as may be the extension member 23. When the weighing scale is at rest, as shown in FIG. 1, the movement 16, together with the extension member 23 and the counterforce member 24 are in a relaxed or normal state, and the bar linkage mechanism 20 is at its shortest length. Accordingly, the weighing scale is in unloaded condition and the weighing platform 21 assumes its highest position. The unloaded state of the weighing scale is indicated in the graphical illustration of FIG. 5 by $K = 0$, and it will be appreciated this graphical illustration pictorially represents in a general manner the functions occurring in the weighing apparatus to assist in explaining the functions taking place during operation of the scale.

Particularly, the forces K acting in the movement 16 are plotted along the abscissa, while the path length at the inlet to the movement representing the position of the point 31 are plotted along the ordinate. It can be appreciated the path length at the inlet to the movement equals the momentary value of the indication unit 17, wherein the position of the point 31 along the bar linkage mechanism represents the value of the weight shown by the indicator. More particularly, the graph of FIG. 5 shows the hysteresis curve 35 of the weighing scale and particularly in branches 36 and 37. When a weighing operation is carried out that responds to an increasing load, the weight value follows the lower branch 37 wherein the effect of an increasing load is shown by an arrow pointing upward along this branch. However, if a weight value in a weighing operation represents a decreasing load, the value measured follows the upper branch 36 of the hysteresis curve, as shown by an arrow pointing downward along this branch. The opposite end points of the hysteresis curve represent on the lower end and the unloaded end of the scale and at the upper end the maximum loading of the scale, and other intermediate loads are represented for every weight value therebetween depending on whether the weighing operation is performed on an ascending or descending direction relative the hysteresis curve branches 36 and 27.

The load 22 on the weighing platform 21 illustrated in FIG. 2 represents on the indicator as indicated by the arrow 40 a state of loading subsequent to a preceding unloaded state. The weight value of the load 22 is equivalent to precisely the half load of the scale as noted by the position of the pointer 18 in FIG. 2. The elongation of the movement 16 illustrated by the inlet portion of the bar linkage mechanism having been extended to a length 30a moves the point 31 downwardly by a length 41 an amount equal to three units, as represented by the dots to the position 31a. This position is plotted on branch 37 of the hysteresis curve in FIG. 5. The force K' acting on the movement here consists of two components, one of which is the downwardly directed weight value G, represented by the force arrow in FIG. 2, and the counterforce P of the counterforce member 24 which is opposite in sign to the force G and much smaller in value. As also illustrated in FIG. 2, it may be noted the effect of the load 22 has caused an elongation of extension member 23 from a value of 4 shown in FIG. 1 to the value of 5 shown in FIG. 2. The outlet portion 29 of the bar linkage mechanism has not increased in length because of its rigidity, but the point 32 in FIG. 1 has moved downwardly by length 43 to the position 32a. Further, the length and thereby the restoring force of the counterforce member 24 have also increased from an original value of 4 as indicated by the dots in FIG. 1 to a value of 8, as indicated by the dots in FIG. 2.

Referring now to FIG. 3, where a state of measurement of the same load 22 is illustrated, the preceding weight load was higher as indicated by the arrow 45 of the pointer 18. A hysteresis effect is illustrated in FIG. 5 along the upper branch 36 of the curve. It should here be appreciated that FIG. 3 represents a hypothetical case which is not in accordance with the present invention and where the upper point of the inlet to the bar linkage mechanism moves to a value of 31b. Accordingly, this point has moved an additional distance downwardly as indicated at 47 in FIG. 3 corresponding to the height between the upper and lower branches 36 and 37 of the hysteresis curve, as indicated at 47 in FIG. 5. Because the extension member 23 is subject to hysteresis, its length has been extended from a value of 5 in FIG. 2 to a value of 5½. Since the additional distance 47 equals about a half unit of length in the extension member due to the hysteresis of the movement 16, the outlet point 32b has moved downwardly a distance 50 of double the distance 47, thereby corresponding to a whole unit of length, as seen from the positions of points 32a in FIG. 2 and 32b in FIG. 3. It has also been hypothetically assumed in FIG. 3 the action of the counterforce member 24 has been the same as in FIG. 2 and which is illustrated in FIG. 3 by separating the end 25 from the attaching point 26 and by showing the extension of the counterforce member to equal eight units, as in FIG. 2. Hysteresis therefore manifests itself in the movement 16 by the pointer 18 indicating a higher value along the graduated scale 19 than shown in FIG. 2 even though the same weight G is measured by the load 22. However, this condition is avoided by the present invention, as illustrated by the conditions shown in FIG. 4.

Referring to FIG. 4, the pointer 18 moves in the same direction as in FIG. 3, as indicated by the arrow 45.

Similarly, as in FIG. 3, the hysteresis of the extension member 23 is the same wherein a length of five and one-half units is produced in the extension member. The bar linkage mechanism outlet point moves to a positive 32c with an increasing load at a point lower than in FIG. 2 for a distance 52. Since the counterforce member 24 is fixed to the support point 26, it has a greater state of elongation compared to the loading in FIG. 2 by a half unit of length from eight to eight and one-half units. Accordingly, a higher counterforce P" is present with this loading since a higher value of force ΔP corresponding to the additional elongation of the counterforce member in FIG. 4 is added to the elongation of the counterforce member in the loading of FIG. 2. Accordingly, a force K" now acts on the movement 16 and which results from the vector sum of the unchanged weight G of the load 22 on the one hand and the counterforce P" of the counterforce member 24 on the other hand. By suitably dimensioning and adjusting the extension member 23 on the counterforce member 25, the conditions illustrated in the graph of FIG. 5 can be achieved. The additional elongation 52 of the extension member 23 shown in FIG. 4 in contrast to that shown in FIG. 2 is dimensioned so that the additional component ΔP acting on the counterforce member 24 equals precisely the value which is obtained from the difference between the force K' resulting from the hysteresis and the force K". The changed relations of the forces in the movements K" to K' assure the bar linkage mechanism inlet point 31c is shifted in height by precisely the same distance 41 as in FIG. 2 relative to the unloaded state so that point 31c assumes the same position as point 31a. However, the working point on the hysteresis curve is on the upper or downwardly projecting branch 36.

Accordingly, it can be appreciated that the present invention does not bring the two branches 36 and 37 of the hysteresis curve 35 into coincidence because such would involve too great an expense which is not practical economically for conventional commercial weighing apparatus. It may therefore be seen that the combined action of the extension member 23 and the counterforce member 24 are so adjusted or tuned to assure an exact value-wise "deception" of the movement 16 in a far simpler and more economical manner. The movement 16 responding to the bar linkage mechanism 20 does not perceive where the force acting upon it emanates and acutally measures in the case of FIG. 4 a force K", while measuring in the case of FIG. 2 a force K'. While the movement 16 follows the hysteresis curve 35, the precise correction force is exerted in the movement in opposition to the direction of the action of weight G by the combined action of the extension member 23 and the counterforce member 24.

In comparing the conditions of the scale in the case of FIG. 2 and the conditions of the scale in the case of FIG. 4, it appears that hysteresis-free conditions prevail at the inlet portion 30a of the bar linkage mechanism since the positions 31a and 31c are the same, and accordingly, the pointer 18 indicates the same value on the graduated scale 19, thereby giving an exact point on the scale for the weight G of the load 22 independent of the position and form of the hysteresis curve 35 of the movement 16. However, a hysteresis effect can be observed in the path length of the bar linkage mechanism outlet portion 29 depending upon whether the subsequent weighing operation is increasing or decreasing since the point 32c is lower than the point 32a.

However, it is just this path length difference that produces a higher restoring force ΔP in the counterforce D" for the case of FIG. 4. The hysteresis curve 35 controls the counterforce P to the right amount for the proper correcting action. A sort of feedback is present. If the bar linkage mechanism point 31c were assumed to be lower than shown in FIG. 4, point 32c would be correspondingly lower wherein a still higher component ΔP would be produced in the counterforce P" so that the movement 16 would have a still somewhat lower force on the pointer 18 and would indicate a lower weight position. It will therefore be seen that deviations encounter an independent counter-regulation so that the measurement indication is automatically controlled in the use of the weighing scale. Accordingly, it will be appreciated that accurate and strictly reproduceable weighing results have been achieved with the present invention whether the measurements are performed subsequent to increasing or decreasing loads.

Further embodiments of the invention are illustrated in FIGS. 6 to 13 where the same reference symbols are used to indicate corresponding components as used in FIGS. 1 to 4.

A vertical sectional view taken through a weighing scale having a circular scale and spring mechanism is illustrated in FIG. 6. The movement includes a measuring spring 55 fixed at one end to the frame 56 and at the other end to a rack gear 57 that is attached to the bar linkage mechanism 20. A pinion gear 58 meshes with the rack gear 57 and has mounted therewith a pointer 18 coacting with a graduated scale 19. A weighing platform 21 is connected to the bar linkage mechanism 20 at its lower end and receives a load 22. An arm 59 extending laterally from the output portion 29 of the bar linkage mechanism is connected to the lower end of the counterforce member 24. The upper end of the counterforce member 24 is fixed to a stationary arm 60 extending from the frame 56. The extension member 23 in the form of a spring forms a spacer in the bar linkage mechanism 20 between the weighing platform 21 and the movement 16.

A modified extension member illustrated in FIG. 7 includes two oppositely directed shackles 62 and 63 interconnected by a compression spring 64 that is compressed under the effect of an increasing weight G, thereby extending the length of the extension member 23. The shackles, together with the compression spring 64 comprising the extension member 23, are arranged between the bar linkage mechanism inlet portion 30 and the bar linkage mechanism outlet portion 29. The counterforce member 24 is constructed in the form of a tension spring that is connected at its lower end 27 to shackle 63.

The embodiment of FIG. 8 showing another form of the invention modifies the conditions explained in connection with the embodiment of FIG. 6. In this embodiment, the movement 16 includes a lever 65 pivoted at one end to a fixed pin 66 and having mounted at the other end a graduated scale 67 moving with the lever. The scale is read at a reading station through a magnifying glass 68 or the like. A measuring spring 55 is connected at one end intermediate the ends of the lever 65 and at the other end to the frame of the machine. The upper end of the bar linkage mechanism 20 is connected intermediate the ends of the lever 65 and between the connection point of the measuring spring 55 and the connection pivot 66. The extension member 23 in the form of a spring is provided in the bar linkage mechanism 20. A translating lever 69 has connected intermediate its ends the lower end of the bar linkage mechanism 20 and is pivotally mounted on a fixed pin 70 that is carried by the housing of the scale. A central portion 71 of the lever 69 forms a part of the bar linkage mechanism 20 which also includes an extension 72 that is suitably connected to the load on the weighing platform which is not shown. Accordingly, the pivot point of the lever 69 at the fixed pin 70 lies outside the bar linkage mechanism 20. Changes in the active lengths 73 and 74 of the lever 69 make is possible to adjust the coaction between the extension member 23 and the counterforce member 24 with respect to each other. The load acts on the shorter lever arm 75 of the lever 69 through the extension 72, whereby the desired leverage ratio can be obtained by adjustment. Further, the counterforce member 24 may be prestressed to a desired value wherein the end 30 is connected to an adjusting device 76 through a guide pulley 77 mounted on a fixed bracket. The adjusting device includes a threaded shaft 78 rotatably supported by the housing of the scale and rotatable by engaging the handle or knob 79. An adjusting nut 80 movable along the threaded shaft 78 has the upper end of the counterforce member 30 secured to it. Actuation of the knob 79 thereby permits adjustment of the tension in the counterforce member 24 to a desired value.

The embodiment of FIG. 9 illustrates the components appropriate to carrying out the present invention as being mounted in the head of a weighing apparatus 82 which includes a circular graduated scale. The components corresponding to those in FIG. 6 to 8 are indicated with the same reference numerals. Movement 16 includes upper and lower generally horizontally extending levers 83 and 84 pivotally mounted at one end in upper and lower bearings 85 and 86. A line 87 interconnects the outer ends of the levers 83 and 84 to provide parallel guidance of rack gear 57 which is connected to pointer 18 through a pinion gear 58. Accordingly, movement of the levers 83 and 84 causes movement of the rack gear 57 and ultimate movement of the pointer 18. Measuring spring 55 is connected to the levers 83 and 84 through a connection made to the lower lever 84 and is also connected to a fixed part of the housing of the scale. The bar linkage mechanism 20, 88 leading to the load of the weight to be determined is divided into two branches bifurcating or splitting the flow of the force. This portion may be regarded as a pair of scissors having a movable blade formed by the translating lever 69. However, the fulcrum 70 is not stationary in the housing of the weighing machine, as in FIG. 8, but lies in the bar linkage mechanism 20. This fulcrum 70 is connected to the inlet portion 30 situated on the opposite side of the tension member 23.

The other blade of the scissors indicated by the numeral 90 is rigidly attached to the bar linkage mechanism 20 and includes the fulcrum 70 for the movable scissors blade 69 which also serves as a translating lever. In the embodiment of FIG. 8, the translating lever 69 is acted upon through the lever portion 75 by the bar linkage extension 88, while the counterforce member 24 acts upon the end of the lever 69 corresponding to the lever arm link 74. The extension member 23 is here provided also in the form of a soft tension spring and is disposed between the ends of the blades 90 and 69 of the scissors arrangement. Since the ends of the extension member 23 can be connected to a plurality of points of attachment 92 along the blades 90 and 69, the effect of the extension member acting between the blades can be adjusted to a desired value. Depending upon the adjustment mode, the larger or lesser part of the weight of the load is transmitted to the movement 16 over this branch of the extension member so that, in dependence thereon, the extension member 23 is extended while the remaining part of the weight is transmitted to the movement 16 over the other branch of the bar linkage mechanism and particularly the arm 75 of the lever 69 and the fixed blade 90. Both components are acted upon by the counterforce of the counterforce member 24 according to the resulting intermediate lengths along the bar linkage mechanism. Accordingly, by utilizing the various points of attachment of the extension member 23, several different adjustment possibilities are provided with the mechanism.

The embodiment of FIG. 12, while in some respects resembling the embodiment of FIG. 9, is simpler in that the translating lever 69 must be pivoted at the movement side of the extension member 23 in the bar linkage mechanism, whereas the effect of the counterforce member 24 is on the load side of the extension member. The bar linkage mechanism inlet portion 30 carries a bracket or shackle 95 which includes the fulcrum 70 of the translating lever 69. The extension member 23, which extends parallel to the shackle 95, acts on the same point of application as the bar linkage mechanism outlet portion 29 at the pivot 96 in the lever 69. Adjustment may be accomplished in this embodiment by varying the lever arm link with respect to the fulcrum 70 and the point of application of the counterforce member 24.

The embodiment of FIG. 11 showing the central portion of the bar linkage mechanism and the counterforce member is similar to the embodiment of FIG. 7. Between the bar linkage mechanism portions 30 and 29, an extension member 23 is mounted which has a highly pronounced inherent hysteresis curve. A plurality of disk springs 100 placed one above the other are enclosed within a casing or housing part 101 that is rigidly connected to the outlet portion 29 of the bar linkage mechanism. The casing or housing 101 is also acted upon by the counterforce member 24 which is in the form of a tension spring. The disk springs 100 include centrally arranged holes or openings and are placed in stacked relation around a sleeve 102 fitted on the upper or inlet portion 30 of the bar linkage mechanism and bottom on a flange 103 held at the lower end of the sleeve 102. Accordingly, one end of the stack of disk springs 100 bottoms on the flange 103 connected to the inlet portion 30 of the bar linkage mechanism, while the upper end of the stack of disk springs bears on an end plate 104 fixed to the casing or housing 101. Accordingly, the disk springs 100 serve as compression springs with pronounced hysteresis curve characteristics that make it possible to avoid the use of a lever transmission system for increasing the hysteresis control at the counterforce member 24.

Figure 10:
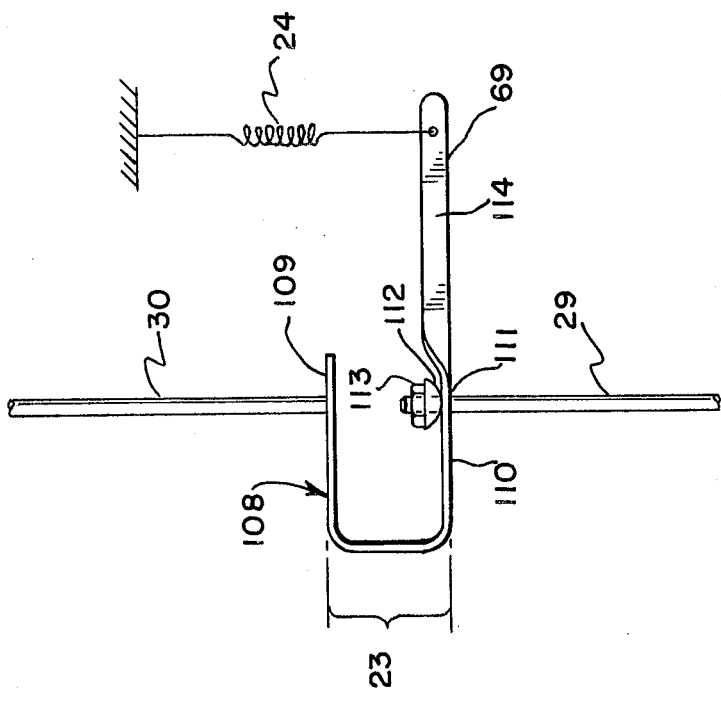
FIG. 10 is a somewhat diagrammatic elevational view of a still further modified extension member according to the invention.

The embodiment of FIG. 10 likewise illustrates only the central part of the apparatus according to the invention wherein the extension member 23 is in the form of a C-shaped deformable shackle or bracket 108 secured between the inlet portion 30 of the bar linkage mechanism and the outlet portion 29 thereof. The shackle 108 includes an upper leg 109 rigidly attached to the inlet portion 30 of the bar linkage mechanism, while the lower leg 110 is provided with a hole 111 through which the upper end of the bar linkage mechanism portion 29 is received. This upper end of the portion 29 has fixed thereto a curved retaining member 112 by means of a nut 113. The curved retaining member 112 bears against the upper side of the lower leg 110. The lower leg 110 includes an extension 114 beyond the hole 111 serving as the translating lever 69 for connection to the counterforce member 24 which is shown here in the form of a tension spring. This embodiment represents a construction of the extension member which is formed by portions 110 and 114 of the translating lever 69.

The final embodiment of the invention illustrated here is shown in FIGS. 13a and 13b and also represents the central portion of the weighing mechanism. The device is shown in unloaded state in FIG. 13a, and in loaded state in FIG. 13b where the weight G acts upon the bar linkage mechanism. A leaf spring 115 extends between bar linkage mechanism portion 30 and 29 and constititues the extension member 23 of the apparatus. A split pin 116, positioned centrally of the leaf spring 115, connects the leaf spring to one end of the translating lever 69. The other end of the translating lever 69 is connected to the counterforce member 24 which is in the form of a tension spring. In the loaded state, the leaf spring 115 is distorted into a generally S-shaped form as shown in FIG. 13a. As seen in FIG. 13b, the pin 116 assumes a tilted position relative to the position shown in FIG. 13a which results in the rotational movement in the translating lever 69 and a corresponding extension of the counterforce member 24 so that a restoring force P is produced as opposed to the weight G. This restoring force is transmitted back to the bar linkage mechanism portion 30 through the translating lever 69 and the pin 116.

While it should be appreciated that several embodiments have been disclosed, it should also be recognized that both the extension member 23 and the counterforce member 24 could be constructed of any desired elastic member, such as a spring or an elastomeric body in the form of a body of rubber. Further, it should be appreciated that gravitationally responsive pendulums could be used in place of the measuring springs.

It will be understood that modifications and variations may be effected without departing from the scope of the novel concepts of the present invention, but it is understood that this application is to be limited only by the scope of the appended claims.

The invention is hereby claimed as follows:

1. In a weighing scale with a movement and indication assembly having a movement means to measure a load and an indication means to indicate the weight of the load, wherein the movement means exhibits hysteresis between weighing operations with increasing and decreasing loads, a weighing platform, a bar linkage mechanism connected between the movement means and weighing platform, and counterforce means connected to the bar linkage mechanism, the improvement in the bar linkage mechanism which includes an extension means between the connection to the counterforce means and the connection to the movement means which increases the path difference of the hysteresis effect, and said extension means having a direction of elongation opposed to the force of the counterforce means.

2. The scale as defined in claim 1, wherein the extension member forms a part of the bar linkage mechanism.

3. The scale as defined in claim 1, wherein the extension member is in the form of an elastic body.

4. The scale as defined in claim 1, wherein the extension member is in the form of a soft tension spring.

5. The scale as defined in claim 1, wherein the extension member is in the form of a compression spring.

6. The scale as defined in claim 1, wherein the extension member is in the form of a telescopically compressible elastic body.

7. The scale as defined in claim 1, wherein the extension member is in the form of a C-shaped deformable shackle.

8. The scale as defined in claim 1, wherein the extension member is in the form of a leaf spring.

9. A weighing apparatus comprising a movement and indicating assembly having a movement means to measures a load and an indication means to indicate the weight of the load, wherein the movement means exhibits hysteresis between weighing operations with increasing and decreasing loads, a weighing platform for receiving a load to be weighed, a bar linkage mechanism connected between the movement means and weighing platform, resilient counterforce means, means connecting the counterforce means to the bar linkage mechanism, and resilient extension means in the bar linkage mechanism between the movement and indication assembly and the connection to the counterforce means coacting with the counterforce means to eliminate the effect of the hysteresis on the indication means to provide successive accurate weight measurements.

10. The weighing apparatus of claim 9, wherein the counterforce means and the extension means are in the form of elastic bodies.

11. The weighing apparatus of claim 9, wherein the counterforce means and the extension means are in the form of tension springs.

12. The weighing apparatus of claim 9, wherein means is provided to adjust the force of the extension means.

13. The weighing apparatus of claim 9, wherein means is provided to adjust the force of the counterforce means.

14. The apparatus of claim 9, wherein the extension and counterforce means include spring elements.

15. The apparatus of claim 14, wherein the paths of elongation of the spring elements are parallel.

16. The apparatus of claim 14, wherein the spring element for the counterforce means functions under tension, and the spring element for the extension member operates under compression.

17. The weighing apparatus of claim 9, wherein the means connecting the counterforce means to the bar linkage mechanism includes a translating lever wherein the load acts on a shorter arm of the lever than the counterforce means.

18. The weighing apparatus of claim 17, wherein the translating lever is pivotally connected to the bar linkage mechanism at a point on the side of the extension member opposite to the counterforce means.

19. The weighing apparatus of claim 17, wherein the translating lever includes a scissors arrangement having stationary and movable blades in the bar linkage mechanism and the extension member is connected between the blades.

20. The weighing apparatus of claim 17, wherein means is provided to adjust the lengths of the lever arms for the extension means and the counterforce means.

21. A weighing apparatus comprising a movement and indication assembly having a movement means to measure a load and an indication means to indicate the weight of the load, wherein the movement means is of the conventional spring type and exhibits hysteresis between weighing operations with increasing and decreasing loads, a weighing platform for receiving a load to be weighed, a bar linkage mechanism connected between the movement means and weighing platform, resilient counterforce means, means connecting the counterforce means to the bar linkage mechanism, and resilient extension means in the bar linkage mechanism between the connection to the counterforce means and the movement means, said extension means including compression means and coacting with the counterforce means to eliminate the effect of the hysteresis in the movement means to provide successive accurate weight measurements.

22. A weighing apparatus as defined in claim 21, wherein said counterforce means includes tension means.

23. A weighing apparatus as defined in claim 21, wherein said compression means includes a plurality of stacked disk springs.

* * * * *

UNITED STATES PATENT AND TRADEMARK OFFICE
CERTIFICATE OF CORRECTION

PATENT NO. : 4,014,396

DATED : March 29, 1977

INVENTOR(S) : Ernst Lohmann and Hans-Joachim Sacht

It is certified that error appears in the above-identified patent and that said Letters Patent are hereby corrected as shown below:

```
Col. 1, line 14, change "each" to --such--;
Col. 6, line 5, change "positive" to --position--;
Col. 8, line 12, change "is" to --it--;
Col. 9, line 4, change "mode" to --made--; and
Col. 11, line 19, change "indicating" to --indication--.
```

Signed and Sealed this

Fifteenth Day of November 1977

[SEAL]

Attest:

RUTH C. MASON
*Attesting Officer*

LUTRELLE F. PARKER
*Acting Commissioner of Patents and Trademarks*